(12) United States Patent
Mizukoshi (10) Patent No.: US 10,303,912 B2
(45) Date of Patent: May 28, 2019

(54) INFORMATION CODE MEDIUM, AND SYSTEM AND APPARATUS FOR READING INFORMATION CODE PROVIDED BY THE SAME

(71) Applicant: DENSO WAVE INCORPORATED, Chita-gun, Aichi-pref. (JP)

(72) Inventor: Hiroaki Mizukoshi, Tokyo (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 13/850,507

(22) Filed: Mar. 26, 2013

(65) Prior Publication Data

US 2014/0084069 A1   Mar. 27, 2014

(30) Foreign Application Priority Data

Sep. 27, 2012 (JP) ................ 2012-214465
Sep. 27, 2012 (JP) ................ 2012-214466

(51) Int. Cl.
*G06K 7/12* (2006.01)

(52) U.S. Cl.
CPC .................... *G06K 7/12* (2013.01)

(58) Field of Classification Search
CPC ....................................... G06K 7/12
USPC ................ 235/468, 494, 462.01–462.49
See application file for complete search history.

(56) References Cited

U.S. PATENT DOCUMENTS 5,388,158 A * 2/1995 Berson .................. 713/176
6,824,061 B1 * 11/2004 Hattersley ............ G06K 7/12
235/462.42
2002/0066786 A1 6/2002 Saito
2005/0178841 A1 8/2005 Jones, II et al.
2007/0205288 A1 * 9/2007 Laser ................ G06K 7/12
235/462.46

(Continued)

FOREIGN PATENT DOCUMENTS

DE   10 2005 057 931 A1   6/2007
JP        H03-214280 A    9/1991

(Continued)

OTHER PUBLICATIONS

"Fluorescence" article from www.wikipedia.com, retrieved Apr. 6, 2015.*
"Jablonski Diagram" article from www.wikipedia.com, retrieved Apr. 6, 2015.*
"Jablonski Diagram" figure from www.wikipedia.com, retrieved Apr. 6, 2015.*

(Continued)

*Primary Examiner* — Daniel A Hess
(74) *Attorney, Agent, or Firm* — Oliff PLC (57) ABSTRACT

An information code is provided as a light transmissive object in which an information code is formed. When visible light is radiated to the object, the object maintains its light transmissive state, with no presentation from an information code in the object. Light of a first wavelength band, which differs from the visible light, is radiated to the object, the information code produces an image on light of a second wavelength band which differs from the first wavelength band. From an information code reader, the light of the first wavelength band is radiated to the information code medium, during which the light of the second wavelength band from the code is received by the reader. Based on reception results of the light of the second wavelength band, the information code is decoded. By way of example, decoded results are used to determine if the information code is authentic.

24 Claims, 7 Drawing Sheets

(56) References Cited

U.S. PATENT DOCUMENTS

2008/0290295 A1    11/2008  Rainer et al.

FOREIGN PATENT DOCUMENTS

| JP | H10-320499 A | 12/1998 |
| JP | H11-161757 A | 6/1999 |
| JP | H11-338966 A | 12/1999 |
| JP | 2001-184544 A | 7/2001 |
| JP | 2003-030582 A | 1/2003 |
| JP | A-2006-318010 | 11/2006 |
| JP | 2008-048135 A | 2/2008 |
| JP | 2012-064179 A | 3/2012 |
| WO | 2009/147874 A1 | 12/2009 |
| WO | 2010/071137 A1 | 6/2010 |

OTHER PUBLICATIONS

European Search Report issued in European Patent Application No. 13161153.5 dated Aug. 20, 2013.
Dec. 1, 2015 Office Action issued in Japanese Patent Application No. 2012-214465.
Dec. 1, 2015 Office Action issued in Japanese Patent Application No. 2012-214466.
Hayato Kawashima et al. "Invisible Two-dimensional Barcode Fabrication inside a Synthetic Fused Silica by Femtosecond Laser Processing Using a Computer-generated Hologram".
Feb. 23, 2016 Office Action issued in Japanese Patent Application No. 2012-214465.
Feb. 23, 2016 Office Action issued in Japanese Patent Application No. 2012-214466.

* cited by examiner

INFORMATION CODE MEDIUM, AND SYSTEM AND APPARATUS FOR READING INFORMATION CODE PROVIDED BY THE SAME

CROSS-REFERENCE TO RELATED APPLICATION

This application is based on and claims the benefit of priorities from earlier Japanese Patent Application Nos. 2012-214465 and 2012-214466 both filed Sep. 27, 2012, the descriptions of which are incorporated herein by reference.

BACKGROUND OF THE INVENTION

Technical Field of the Invention

The present invention relates to an information code medium in which an information code, such as a bar code or a two-dimensional code, is recorded, and to an apparatus, a system and a method of reading an information code from the information code medium.

Related Art

Information codes, such as bar codes and two-dimensional codes, are widely used for various purposes. The ways of using such information codes are also various. For example, a patent document JP-A-2006-318010 discloses a technique for putting an information code on an article without raising any aesthetic or spatial problems. According to this technique, an invisible information medium layer configured by including a coating agent layer is arranged on an article. The coating agent layer is configured to emit light other than visible light (such as infrared light), when ultraviolet light beam is radiated thereto.

According to the technique disclosed in the patent document JP-A-2006-318010, the coating agent layer is also formed into the shape of the bar code or the two-dimensional bar code to be provided on an article. Therefore, normally, the portion that is the invisible information medium layer, in which the information code is arranged, is hardly visible. When an ultraviolet light beam is applied to this portion, the presence of the information code can be visually recognized through the detection of the infrared light emitted from the portion.

Such an information code can also be conveniently used for determining the authenticity of an article. For example, in practical management of articles, an authentic information code may be put on each of authentic articles. Then, in a distribution channel, stores or the like, a manager who manages articles may read the information code put on each of the articles to easily determine the authenticity of the articles. In this way, for example, inauthentic articles can be efficiently found or removed.

For example, when articles are practically managed in this way, a tag (e.g., price tag) may be fastened to each article using a cord, with an information code being printed on the tag. However, in this method, the authenticity of an article can no longer be determined after the tag has been removed. For example, a valuable article, such as a watch, may once be sold and then be resold. In this case, there is a problem that, since the information code is not directly put on the article to be resold, the authenticity of the article cannot be determined on the basis of the information code. However, not applying only to the case of reselling an article, if an information code for determining the authenticity of an article is directly put on the article, beauty of the appearance of the article may be damaged. In addition, since the presence of the information code on the article is easily recognized, there is a concern that this may lead to fraudulent use of the information code.

As a measure against such a problem, it is desirable that an information code is put on an article in such a way that the information code is invisible in a normal environment. A technique related to this measure is disclosed in the patent document JP-A-2006-318010 mentioned above. According to this technique, an invisible information medium layer including a coating agent layer is arranged on an article to be allocated with an information code. The coating agent layer is configured to emit light beam by being excited, that is, light other than visible light (such as infrared light), when an ultraviolet light beam is radiated thereto. The patent document also describes that the coating agent layer is formed into the shape of the bar code or the two-dimensional bar code. Thus, the portion in which an information code is located is provided as the invisible information medium layer which is hardly visible in a normal environment. When ultraviolet light is applied to this portion, the information code can be visually recognized by detecting the infrared light emitted from the portion.

However, in the configuration disclosed in the patent document JP-A-2006-318010, the coating agent layer has to be separately applied, for example, to the external surface of an article to which an information code is allocated. Accordingly, concavities and convexities are likely to be formed on the external surface of the article. In particular, when the coating agent layer is formed into the shape of the bar code or the two-dimensional bar code, complicated concavities and convexities are formed on the external surface of the article.

For example, such a concavo-convex appearance (e.g., in particular, the shadow of the concavities and convexities cast over the surface when they are seen from obliquely above) or a rough touch of the concavities and convexities is unlikely to meet the users' aesthetic preferences. Although the coating agent layer is configured as an invisible information medium layer, the concavities and convexities of the coating agent layer applied to the surface of the article allow the shape of the information code to be defined. If the shape of the information code cannot be defined, the concavities and convexities may imply the allocation of some information to the article and thus safety measures are not necessarily complete.

SUMMARY

Thus it is desired to provide a configuration that hardly allows visual recognition of the presence of an information code allocated to an article in a normal environment but allows an information code reader to more correctly figure out and decode the information code.

In addition, it is also provide an information code reading system and an information code reader which are able to correctly decode an information code in an article and determine the authenticity of the article.

As an exemplary embodiment, there is provided an information code reading system comprising: an information code medium provided as a light transmissive object, wherein an information code is formed in the object, the information code maintaining a light transmissive state of the object without being presented when visible light is radiated to the object but producing an image in response to radiation of light of a first wavelength band to the object, the image being produced on light of a second wavelength band differing from the first wavelength band, the light of the first wavelength band being different from the visible light; and an information code reader that reads the information code produced by the information code medium. The information code reader comprises: an illumination source that radiates the light of the first wavelength band to the information code medium; a light-receiving sensor that receives the light of the second wavelength band emanated from the information code when the light of the first wavelength band is radiated to the information code medium; and decoding means for decoding the information code based on information indicative of the light received by the light-receiving sensor.

Thus, the information code medium is ensured not to indicate the information code when visible light is applied to the object but maintain the state of the object to be transparent. Further, when the illumination light of the first wavelength band different from the wavelength band of the visible light is applied to the object, the information code medium is ensured to produce an image of the information code with the light of the second wavelength band different from the first wavelength band.

With this configuration, in a normal environment in which visible light is applied to the object, the information code is hardly visible. Accordingly, the information code medium is advantageous in an application in which the information code is desired to be invisible in a normal environment.

It is desirable that the configuration further includes a determining means that determines whether or not the information code is an authentic information code, on the basis of the decoding performed by the decoding means.

Being provided with the determining means, security is further enhanced in practically managing the articles each provided with an information code medium. For example, generally, when a third person sees the information code medium, the person will not recognize that the information code is laid in the information code medium. Accordingly, the person will hardly have an opportunity to fraudulently use the information code. Should a third person recognize the presence of the information code, it will be very difficult for the person to provide a similar information code in an object. Therefore, fraudulent use of the information code (e.g., use of an imitated information code) can be effectively prevented. Further, since the information code reader is capable of determining whether an authentic information code has been decoded, the authenticity of the article provided with the information code medium can be determined. Thus, security of the article is fully ensured.

As another exemplary embodiment, there is provided an information code reader comprising: an illumination source that radiates light of a first wavelength band to an information code medium provided as a light transmissive object, wherein an information code is formed in the object, the information code maintaining a light transmissive state of the object without being presented when visible light is radiated to the object but producing an image in response to radiation of light of the first wavelength band to the object, the image being produced on light of a second wavelength band differing from the first wavelength band, the light of the first wavelength band being different from the visible light; a light-receiving sensor that receives the light of the second wavelength band emanated from the information code when the light of the first wavelength band is radiated to the information code medium; and decoding means for decoding the information code based on information indicative of the light received by the light-receiving sensor.

Being provided with the illumination source, the information code reader is able to radiate the illumination light of the first wavelength band to the information code medium. When the illumination light of the first wavelength band is radiated to the information code medium, an image of the information code is produced with the light of the second wavelength band. Accordingly, the light-receiving sensor picks up the image of the information code produced with the light of the second wavelength band. In other words, if only the information code reader is provided, the image of an information code which is hardly visible in a normal environment is picked up and decoded without difficulty. Thus, the information code reader is very advantageous in an application in which a specified person should selectively read the information code medium.

It is desirable that the information code reader further includes a determining means that determines whether or not the information code is a given authentic information code, on the basis of the decoding performed by the decoding means. As mentioned above, being provided with the determining means, the information code is prevented from being fraudulently used and thus the security of the article provided with the information code medium is enhanced.

As another exemplary embodiment, there is provided an information code medium provided as a sheet-shaped light-transmissive object, wherein an information code is formed in the object, the information code maintaining a light transmissive state of the object without being presented when visible light is radiated to the object but producing an image in response to radiation of light of a first wavelength band to the object, the image being produced on light of a second wavelength band differing from the first wavelength band, the light of the first wavelength band being different from the visible light; and an adhesive medium is formed on one of two surfaces of the object, the object having a thickness direction being across the two surfaces.

Thus, the information code medium can be used by being attached to an article (e.g., commercial product, manufacture, etc.) as desired and thus can exert excellent usefulness and convenience. For example, an information code, which is hardly visible in a normal environment, can be put on an article which is not desired to be directly formed with the information code, such as a valuable article or an object made of a material not suitable for forming the information code therein. In this way, the article can be managed being correlated to the distinctive information code.

Still another exemplary embodiment provides a method of reading an information code, including steps of: radiating light of a first wavelength band to an information code medium provided as a light transmissive object, wherein an information code is formed in the object, the information code maintaining a light transmissive state of the object without being presented when visible light is radiated to the object but producing an image in response to radiation of light of a first wavelength band to the object, the image being produced on light of a second wavelength band differing from the first wavelength band, the light of the first wavelength band being different from the visible light; receiving the light of the second wavelength band emanated from the information code when the light of the first wavelength band is radiated to the information code medium; and decoding the information code based on results of reception of the reflected light of the second wavelength band.

It is desirable that the method also includes determining whether or not the information code is a given authentic information code, on the basis of the decoding. This determining means is also similar to the one set forth above.

DETAILED DESCRIPTION OF THE PREFERRED EMBODIMENTS

With reference to the accompanying drawings, hereinafter are described some embodiments of the present invention.

First Embodiment

Referring to FIGS. 1 to 4, a first embodiment of the present invention is described first.

(Information Code Reader)

Figure 1:
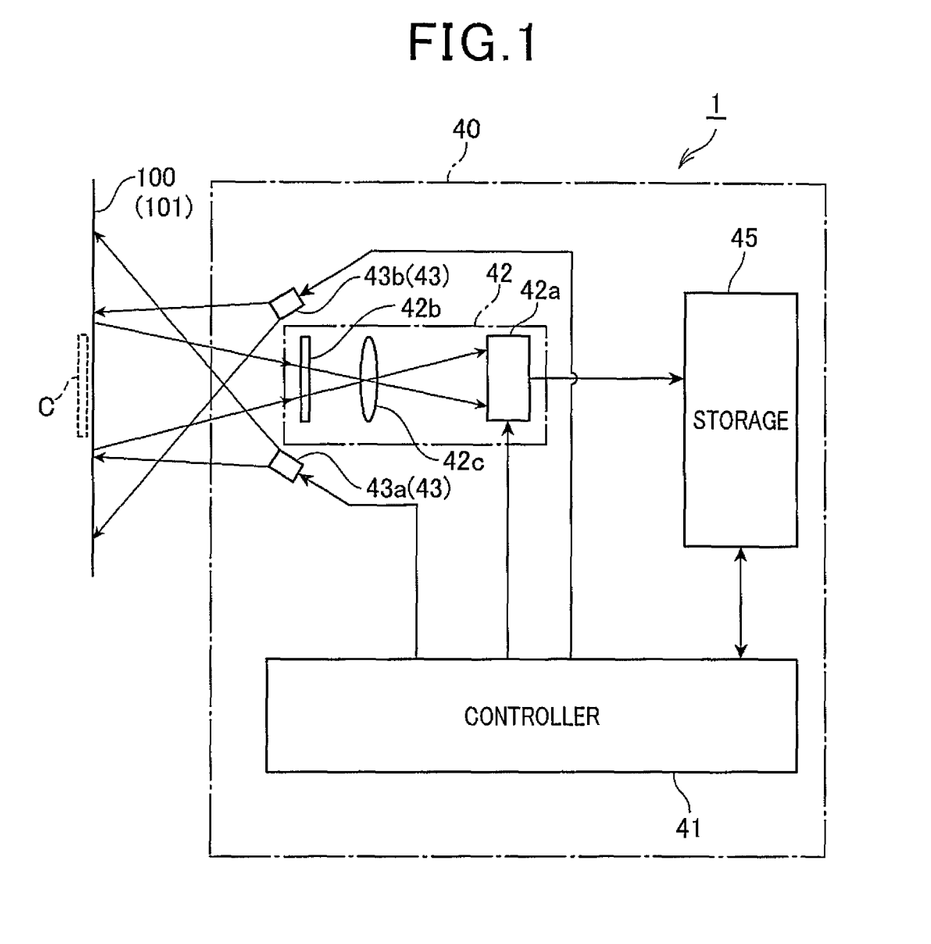
FIG. 1 is a block diagram schematically illustrating an electrical configuration of an information code reading system according to a first embodiment of the present invention.

FIG. 1 is a block diagram schematically illustrating an electrical configuration of an information code reading system 1 according to the first embodiment. The information code reading system 1 is mainly configured by an information code medium 100 and an information code reader 40. Hereinafter, the information code reader 40 is described first.

The information code reader 40 has a function of picking up and reading an image of an information code composed, for example, of a two-dimensional code, such as QR Code™, or a bar code. The information code reader 40 also has a function of reading an information code C (see FIG. 2B) formed in the information code medium 100 (see FIGS. 2A and 2B) which will be specifically described later.

The information code reader 40 includes a control unit 41, an imager 42, an illumination source 43 and a storage 45. The control unit 41 includes a CPU. The imager 42, which configures a light-receiving optical system, is provided in the form of a camera that includes a light-receiving sensor (e.g., C-MOS (complementary metal oxide semiconductor) area sensor, CCD (charge coupled device) area sensor, etc.). The illumination source 43 radiates an illumination beam having a wavelength band of an ultraviolet range. The storage 45 includes storing means, such as a ROM, a RAM and a nonvolatile memory. The information code reader 40 also includes a display (not shown) configured such as by a liquid crystal display, and an operating section (not shown) configured such as by various operating keys.

The control unit 41 is configured by a microcomputer, for example, which is able to control the entire information code reader 40. The control unit 41 includes a CPU, a system bus and an input/output interface and has a function of processing information. The control unit 41 functions as an information processor that can perform various calculation processes and control processes together with the storage 45 which will be specifically described later.

For example, the imager 42 is arranged between a pair of ultraviolet light sources 43a and 43b. When the information code medium 100 is located within an imaging range, the imager 42 functions such that the light-receiving sensor 42a can form, on its light-receiving surface, an image of the light reflected from the information code medium 100 (specifically, the reflected light that has passed through a wavelength-selective filter 42b which will be described later) and that image data received from the information code medium 100 can be produced. The light-receiving sensor 42a is configured to enable reception of the light radiated to and reflected from the information code medium 100. For example, the light-receiving sensor 42a may be an area sensor in which light-receiving elements, i.e. solid-state image sensing devices, such as C-MOSs or CCDs, are two-dimensionally arrayed. The light-receiving sensor 42a functions so as to receive the light having a second wavelength band (described later) of a visible light range from the information code C when the illumination light having a first wavelength band (described later) of an ultraviolet light range is radiated to the information code medium 100.

Figure 3:
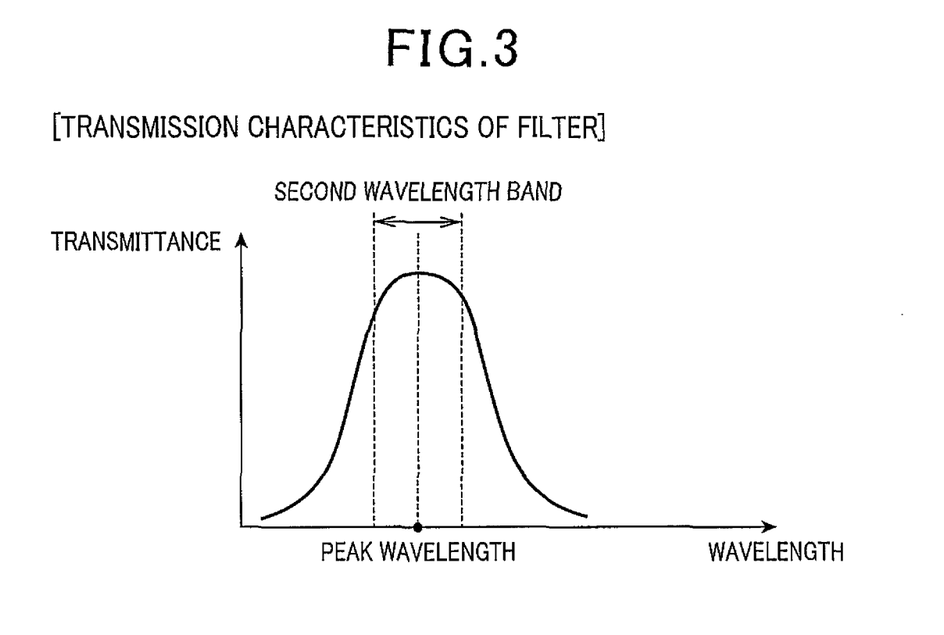
FIG. 3 is a graph illustrating characteristics of a wavelength-selective filter used in the information code reading system.

The wavelength-selective fitter 42b has a high transmittance with respect to the light having a specific wavelength band and a low transmittance with respect to the light having a wavelength band other than the specific wavelength band. For example, the wavelength-selective filter 42b has characteristics as shown in FIG. 3. Specifically, for example, the wavelength-selective filter 42b is configured such that the transmittance becomes the highest with respect to the light of a predetermined wavelength and a wavelength approximate thereto in the second wavelength band. The light of the predetermined wavelength corresponds to the light having a peak wavelength indicated by the center broken line in FIG. 3. The second wavelength band will be specifically described later, but corresponds to the wavelength band of the light emitted from the information code C when ultraviolet light is radiated thereto.

Also, the wavelength-selective filter 42b is configured such that the transmittance becomes low as the wave length becomes larger or smaller than the predetermined wavelength. For example, the wavelength-selective filter 42b is configured so that, when the second wavelength band ranges from 600 nm to 700 nm, the peak wavelength falls within an approximate range of 630 nm to 650 nm. Specifically, the wavelength-selective filter 42b is configured so that the transmittance will be 60% or more in a wavelength band at least ranging from 600 nm to 700 nm and will be less than 60% when the wavelength is 550 nm or less or 750 nm or more.

The imager 42 also includes an imaging lens 42c which is configured such as by a lens-barrel and a plurality of condensing lenses accommodated in the lens-barrel. The imaging lens 42c has a function of forming an image of the information code C (described later) on the light-receiving surface of the light-receiving sensor 42a. An image signal outputted from the light-receiving sensor 42a of the imager 42 serving as the light-receiving optical system is ensured to be stored in an image data storage area, for example, of the storage 45.

The illumination source 43 is provided, for example, on both sides of the imager 42 (light-receiving optical system), or provided sandwiching the imager 42. Specifically, the illumination source 43 is configured by a pair of ultraviolet light sources 43a and 43b that radiate illumination light having a wavelength band of ultraviolet light ranging, for example, from 10 nm to 380 nm, or more specifically, from 200 nm to 300 nm. More specifically, the illumination light source 43 is ensured to radiate ultraviolet light over an imaging range of the imager 42. The wavelength band outside the wavelength band of the ultraviolet light corresponds to an example of the "first wavelength band".

The storage 45 is configured such as by semiconductor memory units which correspond, for example, to a RAM (DRAM (dynamic random access memory), SRAM (static random access memory), etc.) and ROM (EPROM (erasable programmable read-only memory), EEPROM (electrically erasable programmable read-only memory), etc.). In the storage 45, the RAM is configured to include the image data storage area mentioned above, a work area and a reading condition table. The work area is used by the control unit 41 when performing various processes, such as arithmetic operations and logic operations. Further, for example, the ROM is configured to store in advance a given program that can execute various processes, or to store a system program that can control various hardware components, such as the illumination source 43, the light-receiving sensor 42a and the like.

(Information Code Medium)

Hereinafter is described the information code medium 100.

The information code medium 100 is provided as an object 101 having light transmission properties, with the information code C composed of cells being recorded therein. Specifically, the information code C is formed inside the object 101. In other words, the object 101 is provided, or recorded, therein with the information code C and has a desired shape. An example of the desired shape is a plate-like shape, but the shape is not necessarily limited to this shape. In the present embodiment, the object 101 is referred to as the information code medium 100 in a sense that the information code C is recorded (formed) in advance in the object 101.

Figure 2A:
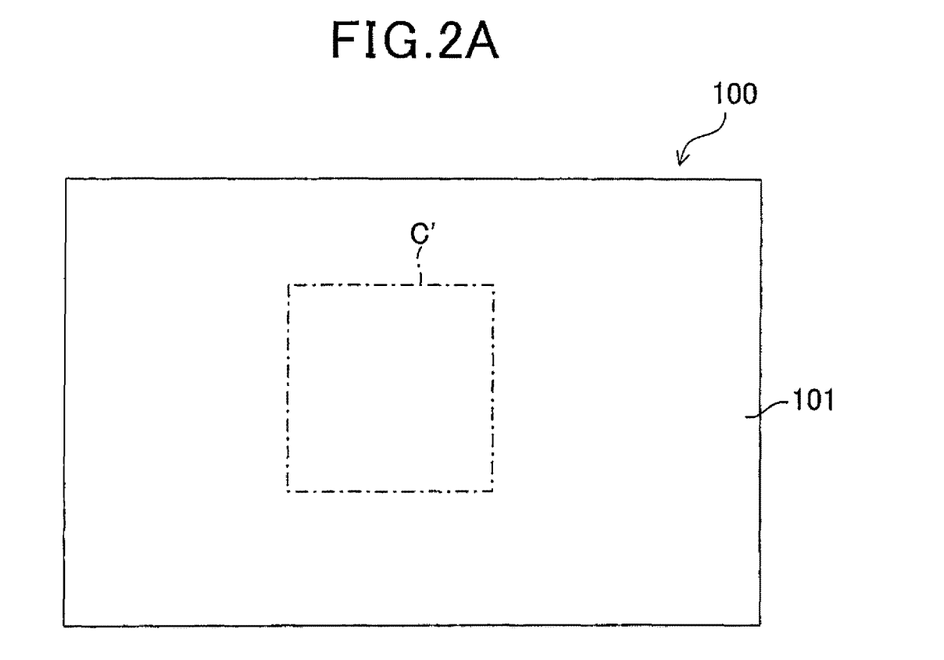
FIG. 2A is a diagram illustrating how an information code medium used in the information code reading system is viewable in a normal environment.

The object 101 is made of a light transmissive (e.g., transparent) material that transmits light. For example, silica glass or the like is favorably used as a material of the object 101. The information code C is formed inside the object 101 by partially altering the composition of the object 101. It is so configured that, when the light having a predetermined wavelength band of a visible light range (e.g., the light having a wavelength band of 380 nm to 750 nm) is applied to the object 101, the information code C is not indicated (i.e. does not show up so as to be visible) but the object 101 is ensured to maintain the transparency. FIG. 2A shows how the information code medium 100 is viewable in a normal environment in which visible light is radiated to the information code medium 100. As can be seen from FIG. 2A, the information code C does not show up in a code region C', i.e. the code region C' remains transparent similar to the region outside the code region C'. In other words, in a normal environment, the information code C is ensured to be invisible to a person.

The information code medium 100 may solely be provided as an article (e.g., commercial product, manufacture, etc.), or may be used by being put on a separate article.

On the other hand, when the light of the first wavelength band different from the wavelength band of visible light is radiated to the object 101, the image of the information code C is ensured to be produced with the light of the second wavelength band different from the first wavelength band. For example, the first wavelength band corresponds to a wavelength band of ultraviolet light ranging from 10 nm to 380 nm, or more specifically, for example, a wavelength band ranging from 200 nm to 300 nm. For example, the second wavelength band corresponds to a wavelength band of visible light ranging from 380 nm to 750 nm, or more specifically, for example, a wavelength band of red light ranging from 600 nm to 700 nm.

In other words, when the light of the first wavelength band is radiated to the object 101, the portion, in which the information code C is formed, becomes luminous with the light of the second wavelength band. In this instance, the information code C is visible to a person. Accordingly, the imager 42 can pick up the image of the information code C, so that the region and the cells of the information code C can be defined.

Figure 2B:
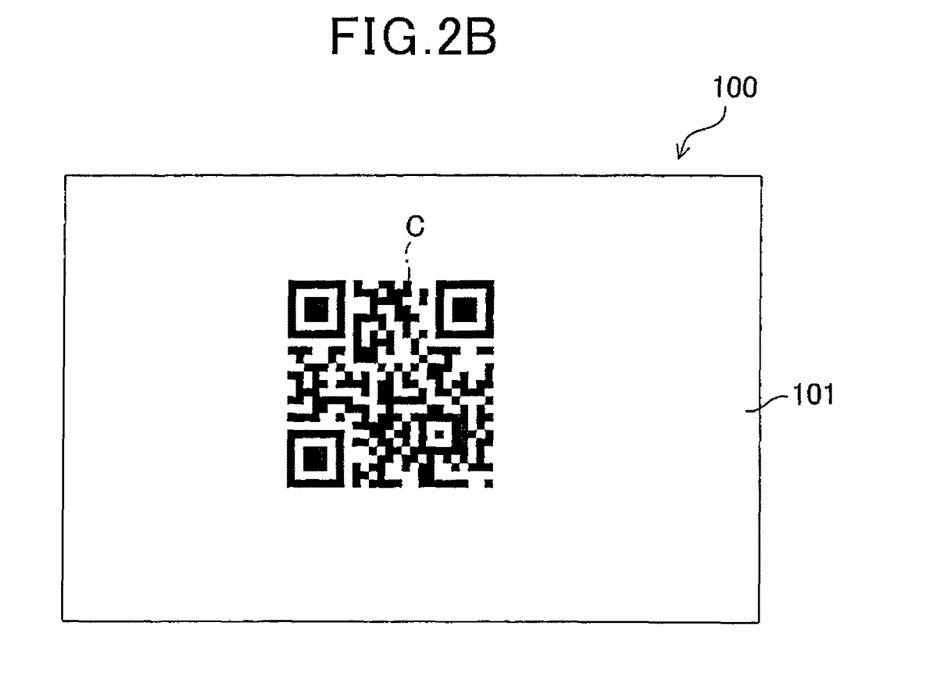
FIG. 2B is a diagram illustrating how the information code medium is viewable in a state where an ultraviolet light beam is radiated thereto.

FIG. 2B shows how the information code medium 100 is viewable when ultraviolet light having a wavelength band ranging from 200 nm to 300 nm is radiated to the information code medium 100. In this case, dark-color cells of the information code C are ensured to become luminous (e.g., become luminous in red) with the visible light having a wavelength band ranging from 380 nm to 750 nm. However, since no special processing has been applied to light-color cells in the information code C, the light-color cells are viewable as being transparent (as being a region not luminous) similar to the region outside the region C'.

The information code medium 100 can be fabricated using well-known technical processes. For example, such technical processes are disclosed in the following documents:

"Invisible two-dimensional barcode fabrication inside a synthetic silica glass by femtosecond laser processing using a computer-generated hologram" by Hayato KAWASHIMA, Masahiro YAMAJI, Jun'ichi SUZUKI and Shuhei TANAKA, *Photonics West* 2011, *SPIE*, The Moscone Center, San Francisco Calif., USA, Jan. 25, 2011;

"Realization of a rewritable transparent marking in quartz glass" by Hayato KAWASHIMA and Huhei TANAKA, *Annual Academic Meeting of Optical Society of Japan*, Optical Society of Japan, Nov. 28 to 30, 2011; and "Transparent marking formed inside silica glass using femtosecond laser" by Hayato KAWASHIMA and Shuhei TANAKA, *The 76$^{th}$ Meeting of Laser Processing Academy*, Laser Processing Academy, Dec. 5, 2011

These processes are based on a femtosecond laser processing technique in which long-focal-depth hologram is used to process silica glass with femtosecond laser. Specifically, in performing the femtosecond laser processing with respect to the object 101 made of silica glass and having a parallelepiped shape, for example, the laser radiation conditions are optimized so as to alter the composition of the glass at a predetermined depth inside the object 101. Through this processing, the information code C, such as a two-dimensional code, is formed (i.e. recorded) at a predetermined depth inside the object 101 (see FIG. 1). In the processing, the information code C is formed as a pattern by using a hologram. In this way, the object 101, in which the information code C is recorded, is provided as the information code medium 100. The object 101, i.e. the information code medium 100, may have any size and shape, but is only required to be made of a transparent material (e.g., silica glass), in the inside of which the composition of the material (glass) can be partially altered with the application of a laser.

Thus, while the light having a predetermined wavelength band of a visible light range is applied to the information medium 100, i.e. the object 101 having transparency, the information code C (pattern) formed inside the object 101, i.e. formed inside silica glass or the like, is invisible. On the other hand, when the illumination light having a wavelength band of ultraviolet light is applied to the object 101, the information code C (pattern) becomes visible with the light having a wavelength band different from the wavelength band of the ultraviolet light.

Inside the object 101, the information code C may be or may not be formed at a fixed depth from its surface. Inside the object 101, the information code may be formed on an oblique plane or line. Alternatively, the information code C may be formed on a curved plane or line.

(Reading Process)

Hereinafter is described a typical example of how a process of reading the information code medium 100 is performed by the information code reader 40, as well as related functions.

In the following typical example, the object 101 can be, for example, a light transmissive (e.g., transparent) part of an article, such as a glass cover of a dial plate of a watch, a glass cup, a glass part of an ornament partially or entirely made of glass, or the like. The following description is provided, taking as an example the case where given identification information has been allocated to the object 101. As mentioned above, the code information medium 100 may solely be provided as an article, or the object 101 formed with a code may be combined with a separate object to provide a single article. The identification information may be an identification number specifically allocated to each object 101, or may be a preset fixed number. Such identification information is stored in advance in the storage 45 of the information code reader 40.

Figure 4:
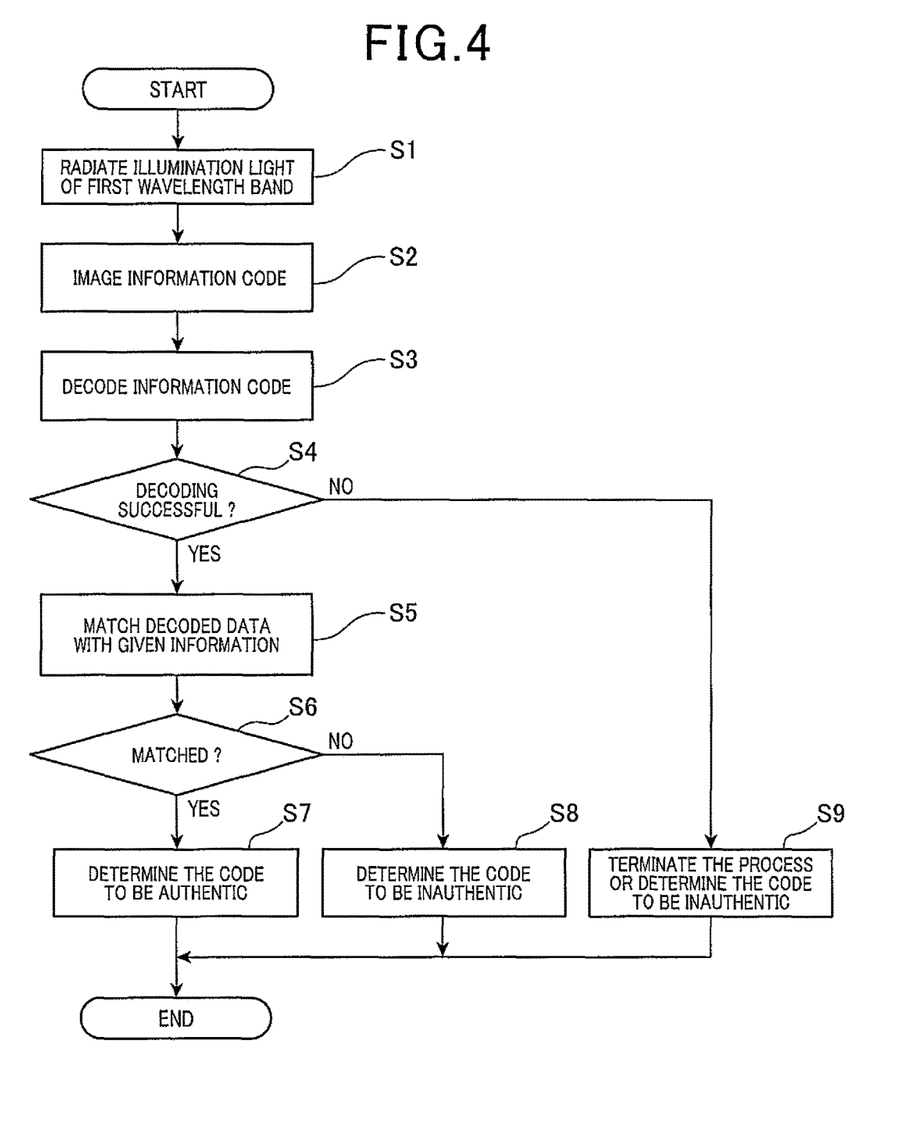
FIG. 4 is a flow diagram illustrating an example of a reading process performed in the information code reading system.

FIG. 4 is a flow diagram illustrating an example of a reading process performed by the information code reader 40. In the reading process shown in FIG. 4, at step S1, the illumination source 43 emits and radiates illumination light, first, having the first wavelength band toward the information code medium 100. In the typical example of the present embodiment, the first wavelength band is a wavelength band of ultraviolet light ranging, for example, from 10 nm to 380 nm (more specifically, for example, a wavelength band ranging from 200 nm to 300 nm). Thus, at step S1, ultraviolet light is radiated to the information code medium 100.

In the present embodiment, the information code medium 100 is configured to produce an image of the information code C in a wavelength band of visible light of a predetermined color, when the illumination light of the first wavelength band is applied to the object 101. In other words, when the light of the first wavelength band is radiated at step S1, the information code medium 100 becomes luminous (emits light) with a wavelength band (second wavelength band) of visible light of a predetermined color. Then, at step S2, the light is received by the light-receiving sensor 42a. More specifically, in the information code medium 100, the dark-color cells of the information code C are ensured to become luminous with red light (having a wavelength band of 600 nm to 700 nm). Thus, at step S2, an image of such luminous dark-color cells is picked up by the light-receiving sensor 42a.

As mentioned above, the information code reader 40 of the present embodiment includes the wavelength-selective filter 42b. The wavelength-selective filter 42b is configured such that the transmittance of the light of the second wavelength band is larger than the transmittance of the light of a predetermined wavelength band outside the second wavelength band. The light-receiving sensor 42a receives the light of the second wavelength band passed through the wavelength-selective filter 42b and forms an image. More specifically, the wavelength-selective filter 42b is configured such that the transmittance of the visible light of a predetermined color will be larger than the transmittance of visible light of colors having a wavelength band different from that of the predetermined color.

For example, when the "visible light of a predetermined color" is red light, the wavelength-selective filter 42b is configured such that the transmittance of red light will be larger than that of light of different colors (e.g., green light or blue light). Accordingly, in this case, the light-receiving sensor 42a selectively receives red light (e.g., light having a wavelength of 600 nm to 700 nm) that has been transmitted through the wavelength-selective filter 42b and forms an image. The light-receiving sensor 42a is configured such that the light that has been transmitted through the wavelength-selective filter 42b is incident on the overall light-receiving region that covers a predetermined range of the sensor 42a. In a decoding process (step S3) that will be described later, the information code C is ensured to be decoded on the basis of the light received in the light-receiving region.

After forming an image at step S2, the obtained image of the information code C is analyzed, at step S3, using a well-known method to decode the information code C. Then, at step S4, it is determined whether or not the decoding at step S3 has been successful. For example, the decoding at step S3 is determined to be unsuccessful if the information code cannot be recognized, or if the information code is of a different type inappropriate for the decoding, or if the recorded contents of the information code are encrypted by an encryption key and the encoded data cannot be decoded. If the decoding at step S3 is determined to be unsuccessful (No at step S4), control proceeds to step S9. At step S9, the reading process is terminated, or the object 101 or the article provided with the object 101 is determined to be inauthentic.

If an affirmative determination is made at step S4 (Yes at step S4), control proceeds to step S5. At step S5, a comparison (data matching) is made to figure out whether the contents decoded at step S3 correspond to the given information. As mentioned above, in the present embodiment, the identification information that should be recorded on an authentic information code is stored in the storage 45 in the form of a single information unit or a list of information units. Thus, at step S5, the information decoded at step S3 is compared (matched) with the identification information registered at the storage 45. For example, when the identification information registered at the storage 45 is a single information unit, the information decoded at step S3 is compared with the information unit.

When the storage 45 stores a list of information units, the information decoded at step S3 is compared with each one of the information units of the identification information in the list stored in the storage 45. Then, control proceeds to step S6. At step S6, if it is determined that the comparison made at step S5 indicates a match (i.e. the information decoded at step S3 includes the identification information registered at the storage 45), control proceeds to step S7 (Yes at step S6). At step S7, the object 101 or the article provided with the object 101 is finally determined to be authentic. On the other hand, if it is determined, at step S6, that the comparison made at step S5 does not indicate a match (i.e. the information decoded at step S3 does not include the identification information registered at the storage 45), control proceeds to step S8 (No at step S6). At step S8, the object 101 or the article provided with the object 101 is finally determined to be inauthentic.

In the present embodiment, the control unit 41 corresponds to an example of the "decoding means". The control unit 41 has a function of decoding the information code C on the basis of the light received by the light-receiving sensor 42a. Specifically, the control unit 41 has a function of decoding the information code C on the basis of the light of the second wavelength band received by the light-receiving sensor 42a. More specifically, the decoding performed by the control unit 41 is based on the light of a predetermined color (typically, red) received by the light-receiving sensor 42a.

The control unit 41 also corresponds to an example of the "determining means". Accordingly, the control unit 41 also has a function of determining whether or not an information code is a given authentic information code, on the basis of the decoding performed by the decoding means. If the decoding is unsuccessful, the information code medium 100 is determined to be inauthentic. Thus, at least on condition that the code decoding performed by the decoding means is successful, the control unit 41 determines the information code medium 100 to be authentic. Specifically, when the decoding performed by the decoding means is successful, the control unit 41 compares the decoded data with the given information prepared in advance (e.g., the identification information stored in the information code reader 40). Then, on the basis of the comparison, the control unit 41 determines whether or not an authentic information code has been decoded.

The storage 45 of the information code reader 40 corresponds to an example of the "given information storing means" that has a function of storing the given information (identification information). When the decoding performed by the decoding means is successful, the control unit 41 corresponding to the determining means exerts the function of comparing the decoded date with the given information stored in the storage 45 (given information storing means) and, on the basis of the comparison, determines whether or not an authentic information code has been decoded.

(Main Effects Exerted by the Above Configuration)

In the configuration described above, the information code medium 100 is ensured not to indicate the information code C but maintain the transparency of the object 101 while visible light is applied to the object 101. However, once the light of the first wavelength band different from the wavelength band of the visible light is applied to the object 101, the information code medium 100 is ensured to produce an image of the information code C with the light of the second wavelength band different from the first wavelength band. With this configuration, the information code C, while being applied with visible light in a normal environment, is not visible. Accordingly, this configuration is advantageous in an application in which the information code C is not desired to be visible in a normal environment.

Being provided with the illumination source 43, the information code reader 40 is able to radiate the illumination light of the first wavelength band to the information code medium 100. When the illumination light of the first wavelength band is radiated to the information code medium 100, the information code medium 100 allows an image of the information code C to be produced with the light of the second wavelength band. Accordingly, the light-receiving sensor 42a forms an image of the information code C, which has been produced with the light of the second wavelength band. Specifically, when the information code C is hardly visible in a normal environment, if only the information code reader 40 is provided, an image of the information code C can be formed and decoded without any difficulty. Accordingly, the information code reader 40 having the above configuration is very advantageous in an application in which the information code C should be selectively read by a specified person.

The information code reader 40 includes a wavelength-selective filter which is configured such that the transmittance of the light of the second wavelength band becomes larger than the transmittance of the light of a predetermined wavelength band outside the second wavelength band. The light-receiving sensor is configured to receive the light of the second wavelength band, which has transmitted through the wavelength-selective filter. The decoding means is configured to decode the information code C on the basis of the light of the second wavelength band received by the light-receiving sensor.

With this configuration, the light of a predetermined wavelength band outside the second wavelength band can be removed from the light incident on the light-receiving sensor. Accordingly, the light-receiving sensor is able to selectively receive the light of the second wavelength band. In this way, the information code reader 40 having the above configuration is able to effectively remove noises, such as the light reflected from the background or ambient light, which have nothing to do with the information code C.

The information code medium 100 is configured to produce an image of the information code C with a wavelength band of visible light of a predetermined color when the illumination light of the first wavelength band is radiated to the object 101. The wavelength-selective filter provided in the information code reader 40 is configured such that the transmittance of the visible light of the predetermined color becomes larger than the transmittance of visual light of other colors having a wavelength band different from that of the predetermined color. The decoding means is configured to decode the information code C on the basis of the light of the predetermined color received by the light-receiving sensor.

With this configuration, the light of other colors outside the wavelength band of the predetermined color (the color in which the information code C is indicated) can be removed. Accordingly, the information code C can be more reliably distinguished from the background image. In particular, in the present system, the information code C is formed in the object 101 made of a transparent material. Therefore, there is a concern that the image of the information code C is picked up being superposed with the image of an object behind the information code C, disabling correct recognition of the shape of the information code C. However, the decoding means configured as above is not only able to selectively recognize the color of the information code C to more correctly recognize the shape of the information code C, making a distinction from the background, but also able to more reliably decode the information code C.

The light-receiving sensor is configured such that the light that has transmitted through the wavelength-selective filter is incident on the overall light-receiving region covering a predetermined range. The decoding means is configured to decode the information code C on the basis of the light received in the light-receiving region. Thus, in the overall light-receiving region of the light-receiving sensor, the light of a predetermined wavelength band outside the second wavelength band is prevented from being incident thereon. In other words, a much wider region of the light-receiving sensor can be used as a region in which the information code C is easily recognized.

The information code medium 100 is configured such that, when the illumination light of the first wavelength band is radiated to the object 101, the image of the information code C is produced with reflected light having a wavelength band of visible light. The light-receiving sensor 42a is configured so as to be able to receive the reflected light having a wavelength band of visible light that configures the image of the information code C. With this configuration, the information code C is maintained to be hardly visible in a normal environment, but ensured to be visible when subjected to the reading process. Accordingly, the user who carries out reading can perform the reading operation with the position of the information code C being correctly grasped. As a result, a decoding error is easily prevented from occurring, which error would otherwise have been caused by the image pickup performed at an offset position.

The information code medium 100 is configured such that, when ultraviolet illumination light is radiated to the object 101, an image of the information code C is produced with reflected light having a wavelength band different from that of the ultraviolet light. The illumination source 43 is able to radiate ultraviolet illumination light. With this configuration, the ultraviolet light a large amount of which is unlikely to hit the object 101 in a normal environment is used as the "illumination light of the first wavelength band". Thus, using the information code reader 40 having this configuration, the probability of accidentally indicating the information code C is kept low.

The information code reader 40 includes the determining means that determines whether or not an authentic information code has been decoded, on the basis of the decoding performed by the decoding means. Accordingly, security is more enhanced in managing or implementing an object allocated with the information code C. For example, generally, when a third person sees the information code medium 100, the person will not recognize that the information code C is laid in the information code medium 100. Accordingly, the person will hardly have an opportunity to fraudulently use the information code C. Should a third person recognize the presence of the information code C, it will be very difficult for the person to lay the similar information code in an object. Therefore, fraudulent use of the information code C (e.g., use of an imitated information code) can be effectively prevented. Further, since the information code reader 40 is capable of determining whether an authentic information code has been decoded, security is fully ensured.

Further, when the decoding performed by the decoding means is successful, the determining means compares (matches) the decoded data with given information prepared in advance. Then, on the basis of the comparison (data matching), the determining means determines whether or not an authentic information code has been decoded. With this configuration, authenticity is determined through the comparison with reference to the given information prepared in advance. Accordingly, a correct determination can be made based on data matching, as to whether or not an authentic information code has been decoded.

The information code reader 40 includes the storage 45 (given information storing means) that stores the given information. When the decoding performed by the decoding means is successful, the determining means compares (matches) the decoded data with the given information stored in the given information storing means. Then, on the basis of the comparison (data matching), the determining means determines whether or not an authentic information code has been decoded. With this configuration, the data used for authentication (the given data) is stored in the information code reader 40. Accordingly, the process of authentication can be performed in a short time and thus authenticity is determined at high speed.

When the decoding performed by the decoding means is unsuccessful, the determining means determines that the information code medium 100 is inauthentic. At least on condition that the decoding performed by the decoding means is successful, the determining means determines that the information code medium 100 is authentic. With this configuration, when a code cannot be decoded, the code is basically always determined to be inauthentic, leading to further enhancement of security.

Second Embodiment

Figure 5:
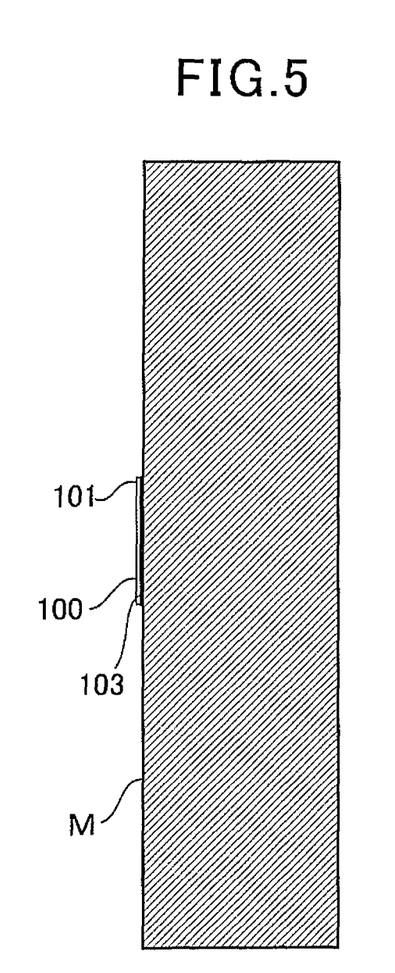
FIG. 5 is an explanatory view illustrating an information code medium used in an information code reading system according to a second embodiment of the present invention.

Referring now to FIG. 5, hereinafter is described a second embodiment of the present invention. In the second and the subsequent embodiments, the components identical with or similar to those in the first embodiment are given the same reference numerals for the sake of omitting unnecessary explanation.

The second embodiment is different from the first embodiment only in the configuration of the information code medium 100. Therefore, description of the information code reader 40 is omitted. FIG. 5 is an explanatory view illustrating the information code medium 100 according to the second. In FIG. 5, the information code medium 100 is put on an article M. As shown, the object 101 is configured to be a plate- or sheet-like shape (e.g., the object 101, when it is separated from the article M, is configured to be a thin flexible member). Also, an adhesive member 103, such as an adhesive agent or glue, is applied to one surface of the object 101 in its thickness direction. The information code medium 100 as a whole is configured as a seal member. The type of the article M is not specifically limited. Various types of articles may be used as the article M.

With this configuration, the information code medium 100 can be used being pasted onto a separate object. This is advantageous when usefulness and convenience are concerned. For example, the information code C, which is hardly visible in a normal environment, can be put on an article which is not desired to be directly formed with the information code C, such as a valuable article or an object made of a material not suitable for putting the information code C thereon. In this way, the article can be managed being correlated to the distinctive information code C.

In the example shown in FIG. 5, the object 101 having a plate- or sheet-like shape is pasted onto the article M using the adhesive medium 103. Alternative to this, the object 101 may be fused and secured onto an external surface of the article M (separate object) via one surface of the object 101 in the thickness direction thereof. For example, a surface of the object 101 or the article M may be thermally or chemically fused for the adhesion between the object 101 and the article M, followed by solidifying the fused portion. With this configuration as well, the information code medium 100 can be secured to a separate object and integrally used with the object. This is advantageous when usefulness and convenience are concerned. Thus, the effects similar to those exerted in the example shown in FIG. 5 can be exerted.

Third Embodiment

Figure 6:
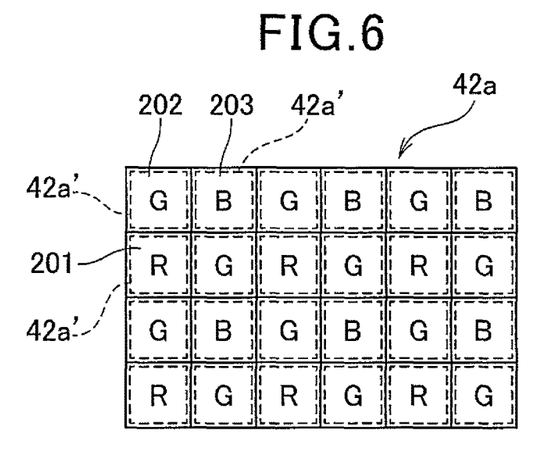
FIG. 6 is a schematic explanatory view illustrating a filter and light-receiving elements, according to a third embodiment of the present invention.
Figure 7:
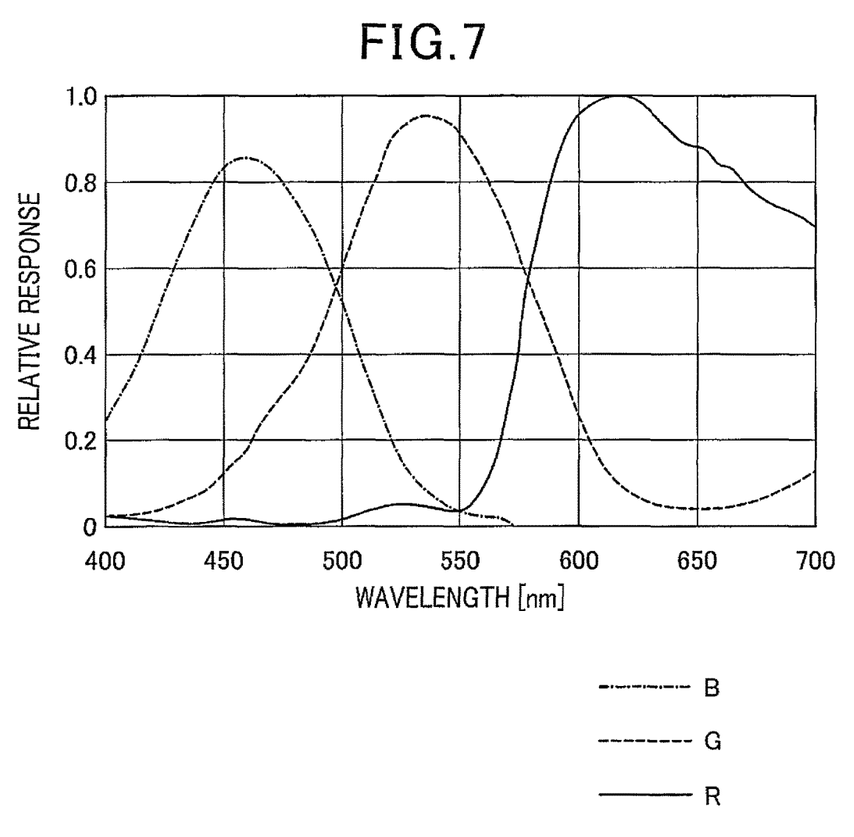
FIG. 7 is a graph illustrating transmission properties of R, G and B filters, according to the third embodiment.

Referring to FIGS. 6 and 7, hereinafter is described a third embodiment of the present invention. The third embodiment is different from the first embodiment only in the configuration of the imager 42. The remaining parts are similar to those of the first embodiment. Specifically, in the third embodiment, the wavelength-selective filter 42b is omitted but, instead, small filters (R filters 201, G filters 202 and B filters 203) are provided. The remaining parts are configured similar to the first or second embodiment. Accordingly, the following description is given also referring to FIGS. 1 to 5.

The information code reader 40 according to the third embodiment includes the light-receiving sensor 42a which is provided with a plurality of pixels (light-receiving elements 42a'). The pixels are provided with respective small filters to configure a color sensor. For example, the color sensor is configured as shown in FIG. 6 (the pixels are only partially shown in FIG. 6). The color sensor includes the small filters, which are at least the R filters 201 (corresponding to the first filters), the G filters 202 (corresponding to the second filters) and the B filters 203 (corresponding to the third filters).

The R filters 201 transmit the light having a wavelength band of a first color (specifically, a wavelength band of red light) and remove the light of a first predetermined wavelength band which is outside the wavelength band of the first color. The G filters 202 transmit the light having a wavelength band of a second color (specifically, a wavelength band of green light) and remove the light of a second predetermined wavelength band which is outside the wavelength band of the second color. The B filters 203 transmit the light having a wavelength band of a third color (specifically, a wavelength band of blue light) and remove the light of a third predetermined wavelength band which is outside the wavelength band of the third color.

The R, G and B filters 201, 202 and 203 are arranged being scattered so that each of the pixels is allocated with any one of the small filters (or specifically, each of the pixels is covered with any one of the small filters). For example, the small filters have characteristics as shown in FIG. 7. In FIG. 7, the dash-dot line B indicates a relationship between wavelength and transmittance in the B filters 203. The broken line G indicates a relationship between wavelength and transmittance in the G filters 202. The solid line R indicates a relationship between wavelength and transmittance in the R filters 201. In the example shown in FIG. 6, the R, G and B filters 201, 202 and 203 are arranged on the basis of the well-know Bayer arrangement. A different arrangement may be alternatively used.

In the present embodiment as well, the information code medium 100 is configured to produce an image of the information code C with a wavelength band of visible light of the first color (e.g., wavelength band of red light ranging from 600 nm to 700 nm) when the illumination light of the first wavelength band (e.g., ultraviolet light similar to that in the first embodiment) is applied to the object 101. The wavelength-selective filter that should selectively pass the light is configured by the plurality of R filters 201 arranged being scattered. The R filters are ensured to have a transmittance of 10% or less at a peak wavelength of transmittance of the B or G filters. Thus, the R filters have a function of well removing green or blue light. The control unit 41 corresponding to the decoding means is configured to decode the information code C on the basis of the light of the first color received by the light-receiving sensor 42a (i.e. the image produced by the pixels to which the R filters 201 are allocated). Signals from the pixels to which the G and B filters 202 and 203 are allocated may only have to be removed or ignored.

With this configuration, the light from the information code C can be selectively recognized without having to drastically change the hardware components in conformity with the configuration using the color sensor.

MODIFICATIONS

The present invention is not limited to the embodiments described above or shown in the drawings. For example, the following modifications may also be included in the technical scope of the present invention.

In the embodiments described above, the illumination source 43 is provided in a housing of the information code reader 40. However, this should not impose a limitation. Alternatively, the information code reader 40 may be configured by a plurality of units. Accordingly, the illumination source 43 may be configured as a lighting unit separate from the housing accommodating the imager 42. Also, the decoding means that decodes the data picked up by the imager 42 may be provided as a unit separate from the housing accommodating the imager 42.

Figure 8:
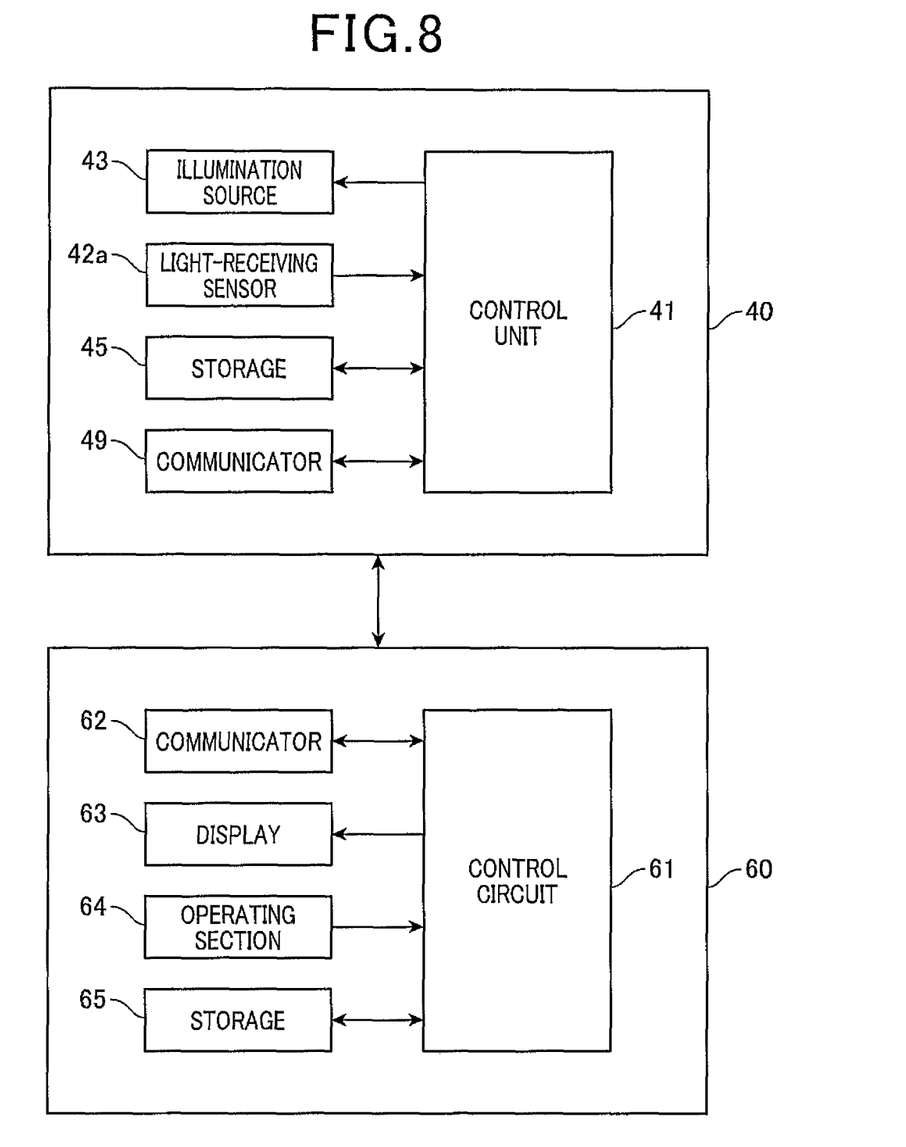
FIG. 8 is a schematic explanatory view illustrating an information code reading system according to a modification.

In addition to the configuration shown in FIG. 1, a management device 60 as shown in FIG. 8 may be provided. The management device 60 shown in FIG. 8 is configured to enable communication with the information code reader 40 of the first embodiment via an internet, a dedicated circuit or the like. In this configuration, the given information (identification information) mentioned above can be stored in the management device 60 instead of the storage 45. In this case, a storage 65 of the management device 60 corresponds to the "given information storing means".

Also, in this case, at step S5 of FIG. 4, the given information (identification information) is requested to the management device 60 by the information code reader 40. Then, in response to the request for the given information (identification information) from the information code reader 40, the management device 60 reads out the given information (identification information) stored in the storage 65 (given information storing means) and transmits the read-out information to the information code reader 40. The management device 60 includes a control circuit 61 and a communicator 62, which correspond to an example of the "controlling means".

In making the comparison and determination at steps S5 and S6, respectively, the given information (identification information) acquired from the management device 60 may be used as a basis of making a comparison/determination similar to the first embodiment. In this case as well, the control unit 41 that makes a comparison and a determination at steps S5 and S6 corresponds to an example of the "determining means". Thus, the control unit 41 requests the given information (identification information) to the management device 60.

Then, upon reception of the given information (identification information) from the management device 60, the control unit 41 compares (matches) the received given information (identification information) with the data decoded by the decoding means. Then, on the basis of the comparison (data matching), the control unit 41 determines whether or not an authentic information code has been decoded.

With this configuration, since the data used for authentication (the given information) is not stored inside the information code reader 40, security is more advantageously enhanced.

The information code C laid in the information code medium 100 may include a record of encoded data that is the data used for authentication, which is encrypted on the basis of a predetermined encryption key and a predetermined encoding process. In this case, the storage 45 of the information code reader 40 may function as the "decryption key storing means" to store therein a decryption key (e.g., the same data as that of the encryption key at the time of generating the information code C) corresponding to the encryption key. Alternatively, the encryption key may be stored in the storage 65 of the management device 60 in the configuration shown in FIG. 8 and a decryption key may be acquired from the external unit (management device 60) at step S3.

Also, in this case, the storage 45 may store a decoding algorithm corresponding to an encoding algorithm (encoding program) (i.e. a decoding program for decoding the encoded data generated on the basis of the encoding algorithm) used for encoding the information code C. Thus, at step S3, the control unit 41 corresponding to the decoding means may decode the encoded data recorded in the information code C using the decryption key stored in advance in the decryption key storing means or the decryption key acquired from the external unit by a decryption key acquiring means, and according to the encoding process.

Specifically, the encoded data is decoded on the basis of the decryption key and the decoding algorithm.

In this case, on condition that the decoding means has succeeded in decoding the encoded data, the control unit 41 corresponding to the determining means determines that an authentic information code has been decoded.

In this way, considerably high security is ensured by providing a configuration in which the distinctive information code medium 100 includes the information code C which is further encoded internally.

In addition, the foregoing embodiments can also be developed into further modifications. For example, in the foregoing embodiments, the illumination source 43 is provided as one of the members of the information code reader 40. However, this illumination source 43 can be separated from the reading apparatus 40 so that the source is provided as a separate member.

Furthermore, the light of the first wavelength band which is different from the visible light, which is for example, the ultraviolet light, can be radiated to the light transmissive object 101 from any direction. That is, the ultraviolet light can be radiated to the frontal surface, the rear surface, or a side surface of the object 101.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An information code reading system comprising:
a light transmissive object provided with a light transmissive component and a two-dimensional information code formed in the component, the information code being composed of an array of two type of cells, one type of cells among the two types of cells being produced by being spatially and partly altered from the component of the object, the component being light transmissive under visible light, the information code
   i) maintaining a light transmissive state thereof such that the information code is invisible in an optical environment of the visible light and
   ii) becoming luminous itself by emitting, from one type of cells among the two types of cells, light of a second wavelength band in response to radiation of light of a first wavelength band to the object differing in wavelengths from the first wavelength band, the emitted light of the second wavelength expressing an image of the cells of the information code, the light of the first wavelength band being ultraviolet light, the light of the second wavelength band including a component of the visible light;
an information code reader that reads the information code presented in the object,
wherein the information code reader comprising:
an imager having an imaging range on the object when the information code reader is directed to the object; and a light-receiving sensor receiving the light of the second wavelength band emitted from the information code in the object when the ultraviolet light is radiated to the object;
processing circuitry configured to decode the information code based on information indicative of the light received by the light-receiving sensor; and
a housing that houses the information code reader; and
an illumination source provided outside the housing as a separate member from the housing and configured to radiate, as illumination light, the ultraviolet light to the object.

2. The information code reading system of claim 1, wherein
the object is shaped into a plate form or a sheet form and is provided as a seal member one of which two surfaces has an adhesive medium, the object having a thickness direction being across the two surfaces.

3. The information code reading system of claim 1, wherein
the object is shaped into a plate form and is configured such that one of two surfaces of the object is fixed to an outer surface of an article.

4. The information code reading system of claim 1, wherein the processing circuitry is configured to determine whether or not the information code is an authentic information code, based on results decoded by the decoding means.

5. The information code reading system of claim 4, wherein the processing circuitry is configured to compare data decoded by the decoding mans with predetermined information when the decoding means has decoded the information code successfully, and determine if the authentic information code is decoded, based on results of the comparison.

6. The information code reading system of claim 5, wherein
the processing circuitry comprises an information storage for storing therein the predetermined information, and
the processing circuitry is configured to compare the decoded data with the predetermined information stored in the information storage when the information code has been decoded successfully, and determine if the authentic information code is decoded, based on results of the comparison.

7. The information code reading system of claim 5, comprising a management device communicable with the information code reader,
wherein the management device is configured to:
have an information storage for storing therein the predetermined information, and
read the predetermined information from the information storage and transmit the read predetermined information to the information code reader responsively to a request for the predetermined information from the information code reader,
wherein the processing circuitry is configured to submit the request for the predetermined information to the management device, compare data decoded by the decoding means with the predetermined information responsively to reception of the predetermined information from the management device, and determine whether or not the information code is a predetermined authentic information code, based on results of the comparison.

8. The information code reading system of claim 4, wherein the object is provided in an information code medium, and
the processing circuitry is configured to determine that the information code medium is inauthentic when the decoding of the information code becomes failure and determine that the information code medium is authentic when conditions are met, the conditions including a condition that the information code is decoded successfully.

9. The information code reading system of claim 4, wherein
the cells of the information code include authentication data encoded based on a predetermined encryption key and a predetermined encryption technique,
the processing circuitry comprises either a key storage for storing therein a decryption key to the encryption key or a key acquiring unit acquiring the decryption key,
the processing circuitry is configured to i) try to decrypt the encrypted data according to the encryption technique and the decryption key stored in the key storage or acquired by the acquiring unit means, and
ii) determine that the information code decoded is an authentic information code when the encrypted data is successfully decrypted.

10. The information code reading system of claim 1, wherein the information code is formed to be embedded inside the object.

11. The information code reading system of claim 10, wherein
the information code comprises, as the array of two types of cells, dark-color cells providing the one type of cells and light-color cells providing the other type of cells among the two types of cells, and only the dark-color cells in the object emit the light of the second wavelength band in response to reception of the light of the first wavelength band.

12. The information code reading system of claim 11, wherein
the information code reader comprises a wavelength-selective filter configured to provide the light of the second wavelength band with a transmittance lager than a transmittance for light of a predetermined wavelength band other than the second wavelength band,
the light-receiving sensor is configured to receive the light of the second wavelength band filtered by the wavelength-selective filter, and
the decoding means is configured to decode the information code based on the information indicative of the light of the second wavelength band received by the light-receiving sensor.

13. The information code reading system of claim 12, wherein
the object is configured to produce the image of the information code based on the visible light of a wavelength band composing a predetermined color when the light of the first wavelength band is radiated to the object,
the wavelength-selective filter is configured to provide the predetermined-color visible light with a transmittance larger than a transmittance for visible light of other colors different in wavelengths from the predetermined color, and
the decoding means for decoding the information code based on the information indicative of the light of the predetermined color received by the light-receiving sensor.

14. The information code reading system of claim 13, wherein
the light-receiving sensor is composed of a color sensor provided with a plurality of pixels and a plurality of small filters arranged at the pixels respectively,
the small filters include a first filter that allows at least light of a wavelength band assigned to a first color to pass therethrough and suppresses light of a first predetermined wavelength band other than the wavelength band assigned to the first color, a second filter that allows light of a wavelength band assigned to a second color to pass therethrough and suppresses light of a second predetermined wavelength band other than the wavelength band assigned to the second color, and a third filter that allows light of a wavelength band assigned to a third color to pass therethrough and suppresses light of a third predetermined wavelength band other than the wavelength band assigned to the third color, wherein the first, second and third filters are arranged to be adjacent to each other,
the object is configured to produce the image of the information code based on the visible light of the wavelength band assigned to the first color when the light of the first wavelength band is radiated to the object,
the wavelength-selective filter is composed of a plurality of the first filters arranged in a scattered state, and
the decoding means for decoding the information code based on the information indicative of the light of the first color received by the light-receiving sensor.

15. The information code reading system of claim 12, wherein
the light-receiving sensor comprises a predetermined-size light-receiving area all of which receives the light filtered by the wavelength-selective filter, and
the decoding means is configured to decode the information code based on results of the light received by the light receiving area.

16. The information code reading system of claim 11, wherein
the object is configured to produce the image of the information code based on reflection of visible light when the ultraviolet light is radiated to the object, and
the light-receiving sensor is configured to receive the reflection of the visible light, the reflection composing the image of the information code.

17. The information code reading system of claim 11, wherein
the object is configured to produce the image of the information code based on emission of light which differs in wavelengths from the ultraviolet light when the ultraviolet light is radiated to the object.

18. The information code reading system of claim 17, wherein the light of the second wavelength band has wavelengths belonging to wavelengths of the visible light.

19. The information code reading system of claim 1, wherein the illumination source is configured to obliquely radiate the ultraviolet light to an imaging field of the imager and the illumination source is oriented to radiate the ultraviolet light to the imaging range of the imager on the object.

20. The information code reading system of claim 1, wherein the illumination source consists of two illumination sources located with the imager therebetween, wherein each of the two illumination sources is configured to obliquely radiate the ultraviolet light to an imaging field of the imager and the illumination source is oriented to radiate the ultraviolet light to the imaging range of the imager on the object.

21. The information code reading system of claim 20, wherein the imager is located to be opposed to the information code inside the object, wherein each of the two illumination sources obliquely radiates the ultraviolet light such that a field of the radiated ultraviolet light from each of the illumination source includes the imaging range on the object.

22. An information code reader comprising:
an imager configured to:
I) image a two-dimensional information code provided in a light transmissive object provided with a light transmissive component in which the two-dimensional information code is formed, the information code being composed of an array of two types of cells, one type of cells among the two types of cells being produced by being spatially and partly altered from the component of the object, the component being light-transmissive under visible light, the information code
i) maintaining a light transmissive state thereof such that the information code is invisible in an optical environment of the visible light, and
ii) becoming luminous itself by emitting, from one type of cells among the two types of cells, light of a second wavelength band in response to radiation of light of a first wavelength band to the object differing in wavelengths from the first wavelength band, the emitted light of the second wavelength expressing an image of the cells of the information code, the light of the first wavelength band being ultraviolet light, the light of the second wavelength band including a component of the visible light; and
II) have an imaging range on the object when the information code reader is directed to the object; and
III) a light-receiving sensor, the light-receiving sensor receiving the light of the second wavelength band emitted from the information code in the object when the ultraviolet light is radiated to the object;
processing circuitry configured to decode the information code based on information indicative of the light received by the light-receiving sensor;
a housing that houses the information code reader; and
an illumination source provided outside the housing as a separate member from the housing and configured to radiate, as illumination light, the ultraviolet light to the object.

23. The information code reader of claim 22, wherein the processing circuitry is configured to determine whether or not the information code is a predetermined authentic information code, based on results decoded by the decoding means.

24. The information code reader of claim 22, wherein the light of the second wavelength band has wavelengths belonging to wavelengths of the visible light and the illumination source is oriented to radiate the ultraviolet light to the imaging range of the imager on the object.

* * * * *

UNITED STATES PATENT AND TRADEMARK OFFICE
CERTIFICATE OF CORRECTION

PATENT NO. : 10,303,912 B2
APPLICATION NO. : 13/850507
DATED : May 28, 2019
INVENTOR(S) : Hiroaki Mizukoshi Page 1 of 1

It is certified that error appears in the above-identified patent and that said Letters Patent is hereby corrected as shown below:

In the Claims

In Column 19, in Claim 8, Line 26, delete "becomes failure" and insert --fails--.

In Column 19, in Claim 12, Line 62, delete "lager" and insert --larger--.

Signed and Sealed this
Fifth Day of November, 2019

Andrei Iancu
*Director of the United States Patent and Trademark Office*